US012681593B2

(12) United States Patent　　(10) Patent No.:　US 12,681,593 B2
Kim et al.　　　　　　　　　　(45) Date of Patent:　　Jul. 14, 2026

(54) DEVICE AND METHOD FOR CONTROLLING MOUSE USING GAZE RECOGNITION

(71) Applicant: HYUNDAI MOBIS CO., LTD., Seoul (KR)

(72) Inventors: Tae Hun Kim, Suwon-si (KR); Sung Joon Ahn, Seoul (KR); Kyung Hoon Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/422,354

(22) Filed: Jan. 25, 2024

(65) Prior Publication Data

US 2025/0021177 A1　　Jan. 16, 2025

(30) Foreign Application Priority Data

Apr. 11, 2023　　(KR) ........................ 10-2023-0047645

(51) Int. Cl.
　G06F 3/038　　　(2013.01)
　G06F 3/01　　　(2006.01)
(52) U.S. Cl.
　CPC .............. G06F 3/038 (2013.01); G06F 3/013 (2013.01)
(58) Field of Classification Search
　CPC ................................. G06F 3/038; G06F 3/013
　See application file for complete search history.

(56) References Cited

U.S. PATENT DOCUMENTS

| | | | | |
|---|---|---|---|---|
| 6,204,828 B1* | 3/2001 | Amir | ....................... | G06F 3/013 |
| | | | | 345/157 |
| 11,836,328 B1* | 12/2023 | Olliphant | ............... | G06V 40/20 |
| 2005/0047629 A1* | 3/2005 | Farrell | .................... | G06F 3/013 |
| | | | | 382/116 |
| 2006/0028400 A1* | 2/2006 | Lapstun | ............. | G02B 27/0093 |
| | | | | 345/8 |
| 2011/0298937 A1* | 12/2011 | Ogawa | ............... | H04N 23/6812 |
| | | | | 348/208.4 |
| 2013/0169533 A1* | 7/2013 | Jahnke | .................... | G06F 3/017 |
| | | | | 345/158 |
| 2013/0265227 A1* | 10/2013 | Julian | ..................... | G06F 3/013 |
| | | | | 345/157 |

(Continued)

FOREIGN PATENT DOCUMENTS

EP　　　　0 487 979 A2　　6/1992

OTHER PUBLICATIONS

Extended European search report issued on Sep. 2, 2024, in counterpart European Patent Application No. 24160166.5 (9 pages).

*Primary Examiner* — William Lu
(74) *Attorney, Agent, or Firm* — NSIP Law

(57)　　　　　ABSTRACT

An apparatus and method for controlling a mouse using gaze recognition are provided. The method includes measuring a distance between eyes of a user and a gaze recognizer in response to a user gazing at an object displayed on a display, setting a size of a mouse pointer based on at least one of the measured distance and a display resolution, performing calibration based on the set size of the mouse pointer, displaying the mouse pointer created based on the calibration on a display, determining occurrence of gaze recognition-based mouse shaking, and controlling a movement of the mouse pointer based on the gaze recognition-based mouse shaking.

10 Claims, 11 Drawing Sheets

(56)                  References Cited

U.S. PATENT DOCUMENTS

| | | | | |
|---|---|---|---|---|
| 2014/0129987 | A1* | 5/2014 | Feit | G06F 3/04817 |
| | | | | 715/835 |
| 2015/0103003 | A1* | 4/2015 | Kerr | G06F 3/0488 |
| | | | | 345/158 |
| 2015/0145777 | A1* | 5/2015 | He | G06V 40/193 |
| | | | | 348/78 |
| 2016/0209917 | A1* | 7/2016 | Cerriteno | G06F 3/013 |
| 2016/0210080 | A1* | 7/2016 | Frank | G06F 3/0604 |
| 2016/0216761 | A1* | 7/2016 | Klingström | G06F 3/014 |
| 2016/0299660 | A1* | 10/2016 | Au | G06F 3/0481 |
| 2018/0239440 | A1* | 8/2018 | Noda | G06F 3/038 |
| 2018/0275753 | A1* | 9/2018 | Publicover | G06F 3/04812 |
| 2018/0364810 | A1* | 12/2018 | Parshionikar | G06F 3/013 |
| 2019/0235729 | A1* | 8/2019 | Day | G06F 3/012 |
| 2019/0377487 | A1* | 12/2019 | Bailey | G06F 1/163 |
| 2020/0249752 | A1* | 8/2020 | Parshionikar | G06F 3/016 |
| 2021/0294413 | A1* | 9/2021 | Manduchi | G06F 3/013 |
| 2022/0084279 | A1* | 3/2022 | Lindmeier | G06F 3/012 |
| 2022/0101612 | A1* | 3/2022 | Palangie | G06T 19/006 |
| 2023/0069764 | A1* | 3/2023 | Jonker | G06F 9/451 |
| 2023/0123723 | A1* | 4/2023 | Kim | G06F 3/013 |
| | | | | 701/36 |
| 2024/0103617 | A1* | 3/2024 | Yerkes | G06F 3/017 |
| 2024/0111361 | A1* | 4/2024 | Tibbling | G06F 3/04812 |
| 2024/0211034 | A1* | 6/2024 | Ye | G06F 3/013 |
| 2024/0345656 | A1* | 10/2024 | Beavers | G06F 3/013 |

* cited by examiner

DEVICE AND METHOD FOR CONTROLLING MOUSE USING GAZE RECOGNITION

CROSS-REFERENCE TO RELATED APPLICATION(S)

This application claims the benefit under 35 U.S.C. § 119 to Korean Patent Application No. 10-2023-0047645, filed on Apr. 11, 2023, in the Korean Intellectual Property Office, the disclosure of which is incorporated by reference for all purposes.

BACKGROUND

1. Field

The disclosure relates to autonomous vehicles (vehicles) in all fields, and more specifically, to a system that moves a mouse pointer via gaze recognition.

2. Description of Related Art

The Society of Automotive Engineers (SAE), the American Society of Automotive Engineers, subdivides autonomous driving levels into a total of six levels, from level 0 to level 5, for example, as follows.

Level 0 (no automation) is a stage in which a passenger controls and takes responsibility for everything in driving. The passenger drives all the time, and a system of an autonomous vehicle performs only auxiliary functions such as emergency notification. This is a level at which a subject of the driving control is human, and the human performs variable detection and takes the responsibility for the driving.

Level 1 (driver assistance) is a stage of assisting the passenger via adaptive cruise control and lane keeping functions. When activated, the system assists the passenger by maintaining a speed of the autonomous vehicle, an inter-vehicle distance, and the lane. This is a level at which the subjects of the driving control are the human and the system, but the human performs the variable detection and takes the responsibility for the driving.

Level 2 (partial automation) is a stage in which the autonomous vehicle and the human may control steering and acceleration/deceleration of the autonomous vehicle at the same time for a certain period of time under specific conditions. Steering on a gentle curve and assisted driving to maintain a distance from a preceding vehicle are possible. However, this is a level at which the human performs the variable detection and takes the responsibility for the driving. The passenger always needs to monitor a driving situation, and the passenger must immediately intervene in driving in a situation that the system does not recognize or the like.

Level 3 (partial automation) is a level at which the system takes charge of driving in sections under specific conditions, such as a highway, and the passenger intervenes only in case of danger. The system performs the driving control and the variable detection during the driving, and the monitoring is not required unlike the level 2. However, in a case of a situation beyond requirements of the system, the system requests the immediate intervention of the passenger.

At level 4 (high automation), the autonomous driving is possible on most roads. The system performs the driving control and takes responsibility for the driving. The intervention of the passenger is unnecessary on most roads except for restricted situations. However, because the intervention of the passenger may be requested under specific conditions such as bad weather, a device for controlling the driving via the human is required.

Level 5 (full automation) is a stage in which the passenger is not required and the driving is possible with only the passenger. The passenger only inputs a destination, and the system takes charge of the driving in all conditions. At the level 5, control devices for the steering, the acceleration, and the deceleration of the vehicle are unnecessary.

Conventionally, when providing a mouse function with gaze recognition, to prevent a mouse pointer from shaking within a narrow area of a display because of eye detection, a median value among existing past 4 points and a current 1 point of an eye movement was used to stabilize a movement of the mouse pointer in a scheme of discarding a pointer that deviates significantly from a gaze, but there was a problem in that shaking occurs within a small area.

SUMMARY

This Summary is provided to introduce a selection of concepts in a simplified format that are further described below in the Detailed Description. This Summary is not intended to identify key features or essential features of the claimed subject matter, nor is it intended to be used as an aid in determining the scope of the claimed subject matter.

In a general aspect of the disclosure, a method for controlling a mouse using gaze recognition includes: measuring a distance between eyes of a user and a gaze recognizer in response to a user gazing at an object displayed on a display; setting a size of a mouse pointer based on at least one of the measured distance and a display resolution; performing calibration based on the set size of the mouse pointer; displaying the mouse pointer created based on the calibration on a display; determining occurrence of gaze recognition-based mouse shaking; and controlling a movement of the mouse pointer based on the gaze recognition-based mouse shaking.

The setting of the size of the mouse pointer may include: setting a minimum size of the mouse pointer based on the measured distance; checking a maximum size of the pointer based on a button layout within a screen; checking a display resolution-pointer size; determining whether the display resolution-pointer size is smaller than the minimum size of the mouse pointer based on the measured distance; and increasing the size of the pointer within the screen such that the pointer is displayed in a physical minimum size in response to the display resolution-pointer size being smaller than the pointer minimum size.

The performing of the calibration based on the set size of the mouse pointer may include performing the calibration for eye location and movement based on the gaze recognition-based mouse shaking, determining a shaking range based on a gazed point based on the user gaze, and creating the size of the mouse pointer based on the determined shaking range.

The displaying of the mouse pointer created based on the calibration on the display may include: determining whether the display resolution-pointer size is equal to or smaller than a maximum size of the mouse pointer created by the calibration; limiting the size of the mouse pointer up to the maximum size in response to the display resolution-pointer size not being equal to or smaller than the maximum size of the mouse pointer created by the calibration; and displaying the mouse pointer whose size is limited up to the maximum size on the display.

The controlling of the movement of the mouse pointer based on the gaze recognition-based mouse shaking may include: determining whether the gaze recognition-based mouse shaking occurs; determining whether the shaking range is greater than an area of the created mouse pointer in response to the mouse shaking; controlling the mouse pointer to move in response to the shaking range being greater than the area of the mouse pointer; and controlling a location of the mouse pointer to be fixed in response to the shaking range being smaller than the area of the mouse pointer.

In another general aspect of the disclosure, a device for controlling a mouse using gaze recognition includes: a display configured to display data, information, or contents on a screen; a gaze recognizer configured to capture a facial image of a user gazing at the screen of the display to recognize a user's gaze; a distance measurer configured to measure a distance between user's eyes and the gaze recognizer; and a mouse controller configured to, in response to a user gazing at an object displayed on the display: control a mouse pointer based on the results recognized and measured by the gaze recognizer and the distance measurer; set a size of the mouse pointer based on at least one of the measured distance and a display resolution; perform calibration based on the set size of the mouse pointer; display the mouse pointer created based on the calibration on the display; determine occurrence of gaze recognition-based mouse shaking; and control a movement of the mouse pointer based on the gaze recognition-based mouse shaking.

The mouse controller may be further configured to: set a minimum size of the mouse pointer based on the measured distance; check a maximum size of the pointer based on a button layout within the screen; check a display resolution-pointer size; determine whether the display resolution-pointer size is smaller than the minimum size of the mouse pointer based on the measured distance; and increase the size of the pointer within the screen such that the pointer is displayed in a physical minimum size in response to the display resolution-pointer size being smaller than the pointer minimum size.

The mouse controller may be further configured to: perform the calibration for eye location and movement based on the gaze recognition-based mouse shaking; determine a shaking range based on a gazed point based on the user gaze; and create the size of the mouse pointer based on the determined shaking range.

The mouse controller may be further configured to: determine whether the display resolution-pointer size is equal to or smaller than a maximum size of the mouse pointer created by the calibration; limit the size of the mouse pointer up to the maximum size in response to the display resolution-pointer size not being equal to or smaller than the maximum size of the mouse pointer created by the calibration; and display the mouse pointer whose size is limited up to the maximum size on the display.

The mouse controller may be further configured to: determine whether the gaze recognition-based mouse shaking occurs; determine whether the shaking range is greater than an area of the created mouse pointer in response to the mouse shaking; control the mouse pointer to move in response to the shaking range being greater than the area of the mouse pointer; and control a location of the mouse pointer to be fixed in response to the shaking range being smaller than the area of the mouse pointer.

The mouse controller may be further configured to fix an existing mouse pointer location in case the shaking range is greater than the area of the mouse pointer.

Effects obtainable from the present disclosure are not limited to the effects mentioned above, and other effects not mentioned will be clearly understood by those skilled in the art in the technical field to which the present disclosure belongs from the description below.

BRIEF DESCRIPTION OF THE DRAWINGS

FIG. 2 is a diagram illustrating an example in which an autonomous driving apparatus according to any one of embodiments of the present disclosure is applied to a vehicle.

DETAILED DESCRIPTION

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
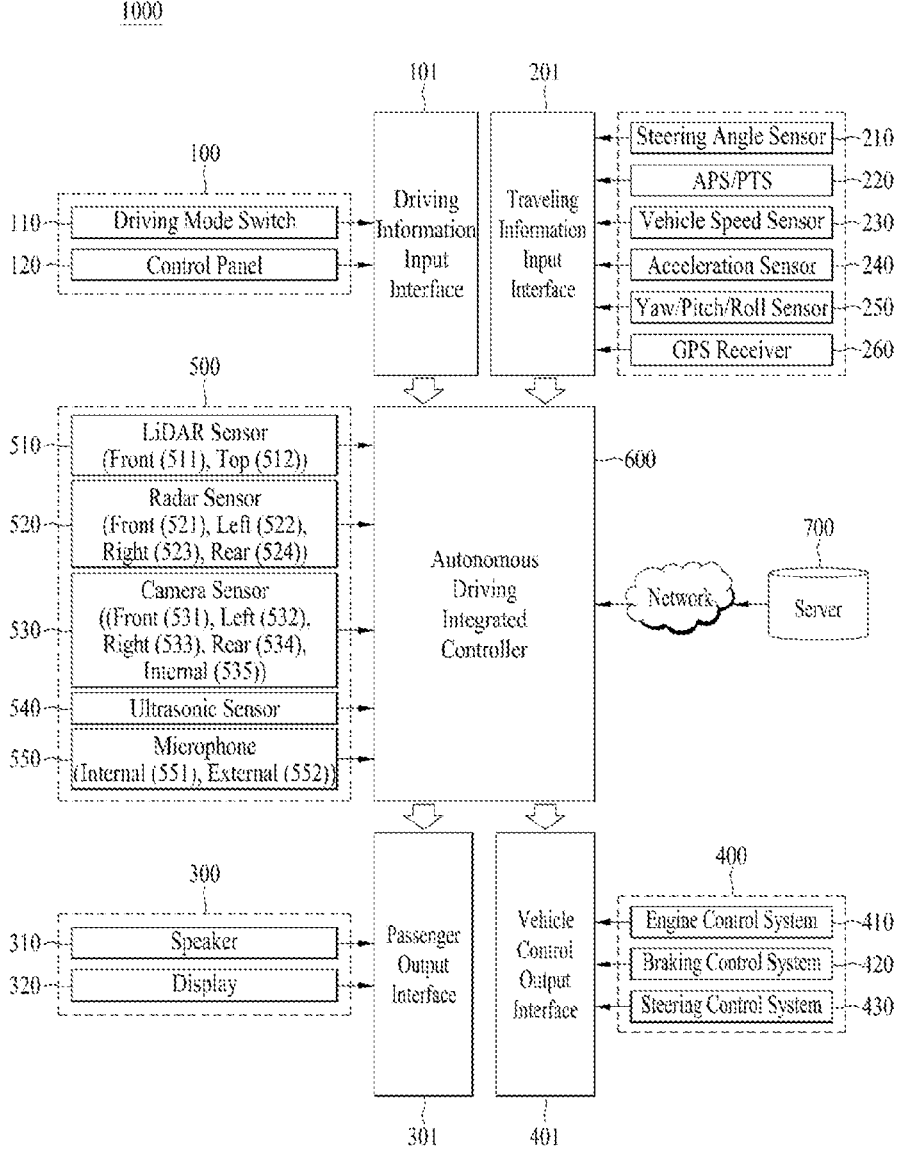
FIG. 1 is an overall block diagram of an autonomous driving control system to which an autonomous driving apparatus according to any one of embodiments of the present disclosure is applicable.
Figure 2:
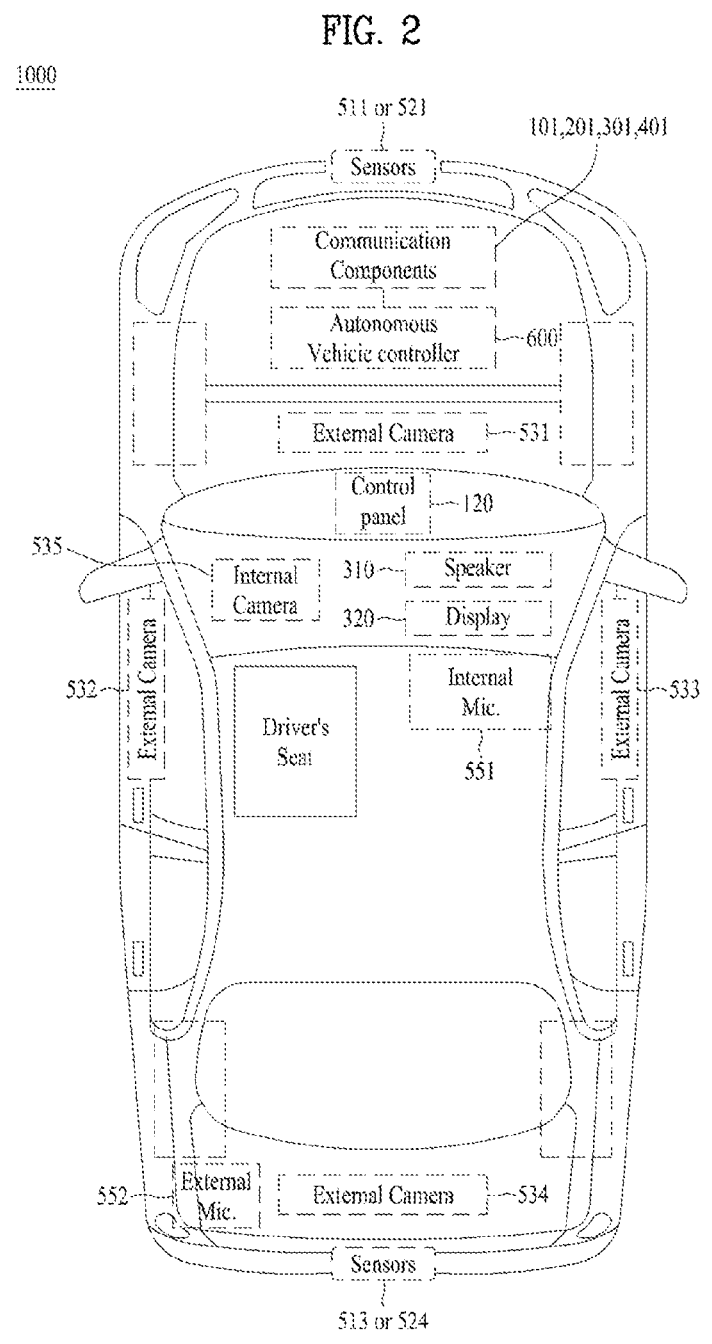

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 (e.g., a processor) that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/ safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/ pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LIDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
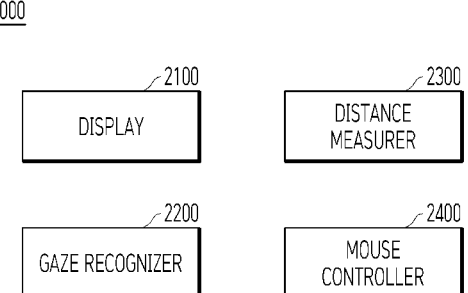
FIG. 3 is a block diagram for illustrating a mouse control device using gaze recognition according to one of embodiments of the present disclosure.

FIG. 3 is a block diagram for illustrating a mouse control device using gaze recognition according to one of embodiments of the present disclosure.

Referring to FIG. 3, a mouse control device 2000 using gaze recognition includes a display 2100, a gaze recognizer 2200, a distance measurer 2300, and a mouse controller 2400.

The display 2100 outputs data, information, and contents on a screen. The display 2100 may display mouse pointer information under control of a controller 140.

The gaze recognizer 2200 may capture a face of a user looking at the screen of the display 2100 and recognize a gaze. To this end, the gaze recognizer 2200 may include a camera for capturing the face of the user, and may recognize the gaze by distinguishing eyes from the face image captured via the camera.

For example, the gaze recognizer 2200 may capture an image of the user's eyes via an infrared camera.

The distance measurer 2300 may measure a distance between the user and the gaze recognizer 2200. Thereafter, the distance measurer 2300 may measure the distance between the user's eyes recognized by the gaze recognizer 2200 and the gaze recognizer 2200.

Additionally, the distance measurer 2300 may calculate a distance from the user's eyes to the display 2100. To this end, distance measurer 2300 may measure a distance between the display 2100 and the user using an ultrasonic sensor or various other schemes. For example, as is generally known, the distance may be calculated using a radio wave or a wireless signal that is not harmful to humans.

The mouse controller 2400 may control a mouse pointer based on the recognition results from the gaze recognizer 2200 and the distance measurer 2300. In this regard, the mouse pointer may be a mouse pointer displayed on the display 2100 in front of the user.

For example, the mouse pointer displayed on the display 2100 ahead may be displayed in a form of a circle, a square, and the like, but may not be limited thereto.

The mouse controller 2400 may set a size of the mouse pointer based on at least one of the measured distance and a display resolution.

To this end, the mouse controller 2400 may set a minimum size of the mouse pointer based on the measured distance. The mouse controller 2400 may check a maximum size of the pointer based on a button layout within the screen displayed on the display 2100. The mouse controller 2400 may check the size of the pointer based on the display resolution. The mouse controller 2400 may determine whether the display resolution-pointer size is smaller than the minimum size of the mouse pointer based on the measured distance. The mouse controller 2400 may increase the size of the pointer within the screen such that the pointer is displayed in a physical minimum size in response to that the display resolution-pointer size is smaller than a minimum pointer size.

The mouse controller 2400 may perform calibration based on the set size of the mouse pointer. The mouse controller 2400 may perform the calibration for eye location and movement based on the gaze recognition. The mouse controller 2400 may determine a range of shaking based on a gaze point depending on a user's gaze. The mouse controller 2400 may create the size of the mouse pointer based on the determined shaking range.

The mouse controller 2400 may determine whether the display resolution-pointer size is equal to or smaller than the maximum size of the mouse pointer created by the calibration. The mouse controller 2400 may limit the size of the mouse pointer up to the maximum size in response to that the display resolution-pointer size is not equal to or smaller than the maximum size of the mouse pointer created by the calibration. The mouse controller 2400 may display the mouse pointer whose size is limited up to the maximum size on the display 2100.

The mouse controller 2400 may determine whether mouse shaking based on the gaze recognition occurs. In response to that the mouse shaking occurs, the mouse controller 2400 may determine whether the shaking range is greater than an area of the created mouse pointer. The mouse controller 2400 may control the mouse pointer to move in response to that the shaking range is greater than the area of the mouse pointer. The mouse controller 2400 may control a location of the mouse pointer to be fixed in response to that the shaking range is smaller than the area of the mouse pointer.

Figure 4:
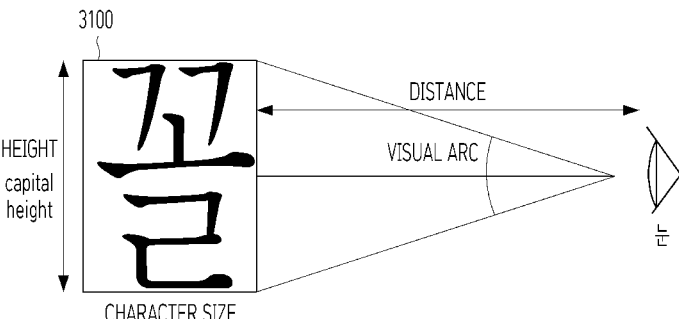
FIG. 4 is a diagram for illustrating a minimum size of a mouse pointer according to one of embodiments of the present disclosure.

FIG. 4 is a diagram for illustrating a minimum size of a mouse pointer according to one of embodiments of the present disclosure.

Referring to FIG. 4, the mouse controller 2400 may set the minimum size of the mouse pointer displayed on the display 2100 to be an appropriate size suggested by ergonomics data. For example, the pointer minimum size may be provided as a minimum size for each distance based on 16 arc mins.

The mouse controller 2400 may set a size of a character 3100 displayed on the display 2100 to 2*a height, wherein the height is calculated based on a tangent value of Visual arc/2.

Therefore, the mouse controller 2400 may provide the mouse pointer based on the estimated corresponding length of the character 3100. For example, when a distance between the user's eyes and the character displayed on the display 2100 is 80 cm, the size of the character may be set to 3.73 mm, and when the distance between the user's eyes and the character displayed on the display 2100 is 200 cm, the size of the character may be set to 9.4 mm.

Figure 5:
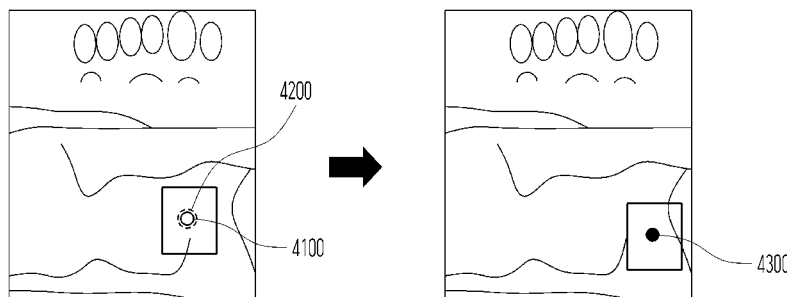
FIG. 5 is a diagram for illustrating a size of a mouse pointer based on a resolution according to one of embodiments of the present disclosure.

FIG. 5 is a diagram for illustrating a size of a mouse pointer based on a resolution according to one of embodiments of the present disclosure.

Referring to FIG. 5, the mouse controller 2400 may create a mouse pointer 4100 based on the display resolution.

The mouse controller 2400 may compare a physical mouse pointer size 4200 that the user may visually check with the mouse pointer 4100 based on the display resolution.

In this regard, when the display resolution is high, the size of the mouse pointer becomes smaller in inverse proportion to the high resolution, so that the mouse controller 2400 may display a mouse pointer 4300 enlarged to have the minimum size that the user may visually check on the display 2100 in response to that a size of the mouse pointer 4100 is smaller than the visually required minimum size 4200 of the mouse pointer because of the high resolution.

Figure 6:
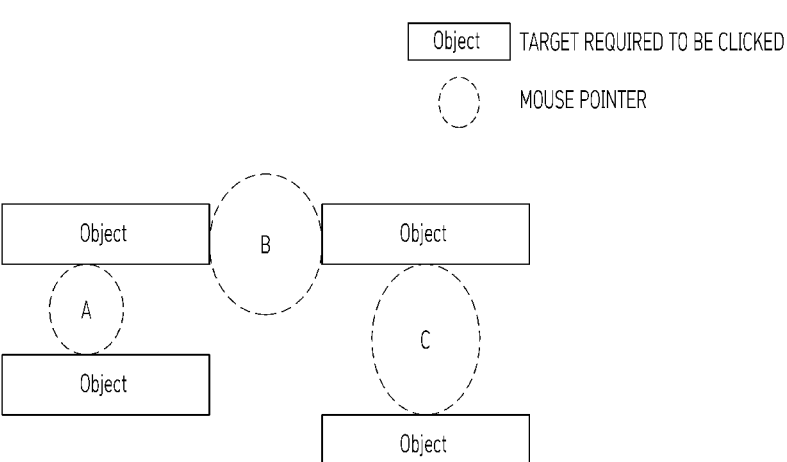
FIG. 6 is a diagram for illustrating a maximum size of a mouse pointer according to one of embodiments of the present disclosure.

FIG. 6 is a diagram for illustrating a maximum size of a mouse pointer according to one of embodiments of the present disclosure.

Referring to FIG. 6, an object that is a target required to be clicked by the mouse pointer may be disposed on the display 2100. When a plurality of objects are disposed, the maximum size of the mouse pointer may be set to be slightly smaller than a size with a diameter that is the smallest among distances between the objects.

Therefore, the maximum size of the mouse pointer may be a size obtained by subtracting a preset small value 'a' from the smallest among the distances between the objects. In this regard, the 'a' may be set to a very small number because the maximum size of the pointer must be smaller than the distance between the objects.

For example, when the distances between the plurality of objects are A, B, and C and the sizes of the distances between the objects are A<B<C, the maximum size of the mouse pointer may be set to the smallest size, A-a.

Figure 7:
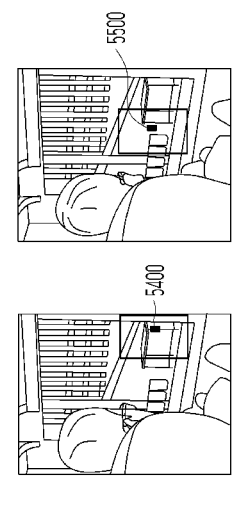
FIGS. 7 to 9 are diagrams for illustrating mouse pointer calibration according to one of embodiments of the present disclosure.
Figure 7:
Figure 7:
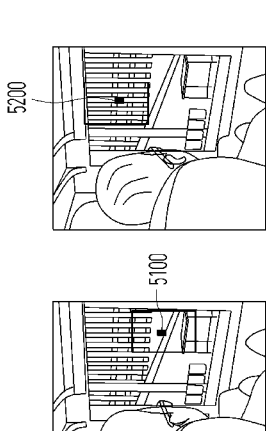
Figure 8:
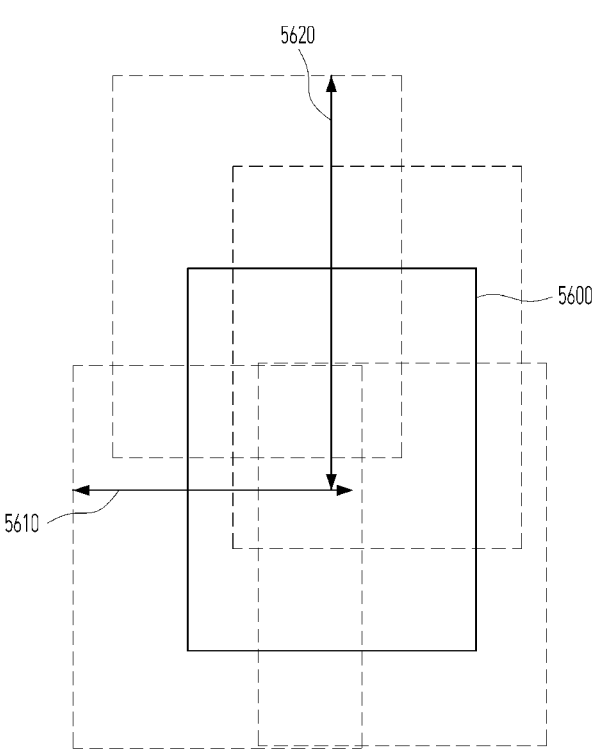
Figure 9:
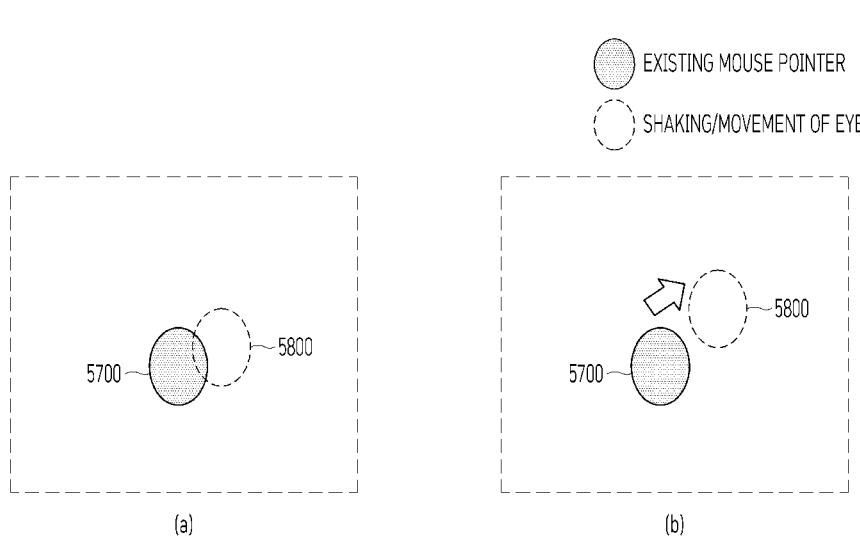

FIGS. 7 to 9 are diagrams for illustrating mouse pointer calibration according to one of embodiments of the present disclosure.

Referring to FIG. 7, when the user gazes at five points 5100, 5200, 5300, 5400, and 5500 starting from a center to four corners of the display 2100, the mouse controller 2400 may perform the calibration for the eye location and movement. Accordingly, the user may check the location of the mouse pointer and move the mouse pointer.

For example, the user may perform the calibration in a clockwise order starting from the center point of the display 2100, then an upper left point, an upper right point, a lower right point, and a lower left point of the display 2100.

Referring to FIG. 8, the mouse controller 2400 may perform calibration for mouse size selection after performing the calibration for the eye location and movement. The mouse controller 2400 may determine a shaking range based on an area 5600 of the mouse pointer in response to that the user is gazing at the displayed point. To this end, the mouse controller 2400 may check coordinates of the shaking from a user's gaze focus and create a mouse size based on the greatest distance.

For example, in response to that the mouse pointer is shaking, the mouse controller 2400 may compare the furthest horizontal length 5610 and vertical length 5620 of the area of the mouse pointer with each other based on the coordinates of the shaking. The mouse controller 2400 may create the mouse size based on the vertical length 5620 when the vertical length 5620 is the greatest.

Referring to (a) in FIG. 9, the mouse controller 2400 may determine that the mouse is not moving in response to that no shaking occurs beyond a mouse distance from a mouse pointer 5700, which is created based on the greatest distance of the shaking.

In other words, in response to that a shaken shape 5800 of the existing mouse pointer 5700 does not deviate from the mouse size area, the mouse controller 2400 may control the mouse pointer 5800 so as not to move and be fixed at a current location.

In one example, referring to (b) in FIG. 9, the mouse controller 2400 may control the mouse pointer to move in response to that the shape 5800 that has moved from the existing mouse pointer 5700 is out of the mouse size area.

Therefore, when the mouse size 5600 is set based on the eye shaking in the calibration and the shaken shape 5800 of the mouse based on the gaze moves a distance greater than the size of the mouse pointer 5700, the mouse controller 2400 may correct the gaze recognizing mouse shaking in a scheme of moving the mouse pointer 5700 in response to the shaking of the eyes.

Figure 10:
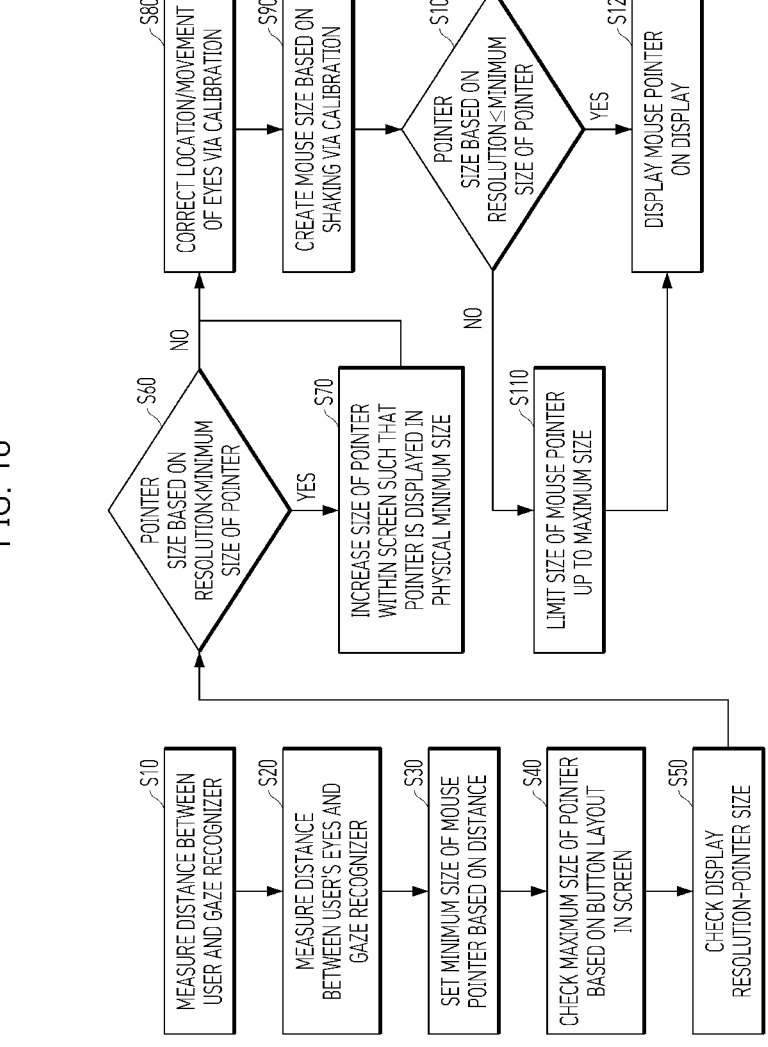
FIGS. 10 and 11 are flowcharts showing a mouse control method using gaze recognition according to embodiments of the present disclosure.
Figure 11:
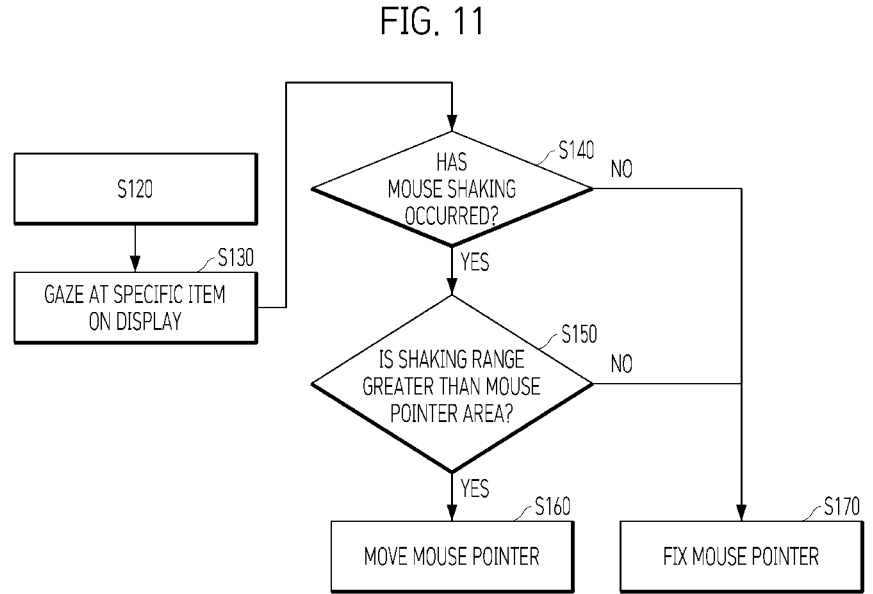

FIGS. 10 and 11 are flowcharts showing a mouse control method using gaze recognition according to embodiments of the present disclosure.

Referring to FIGS. 10 and 11, the mouse control device 2000 using the gaze recognition may measure the distance between the user and the gaze recognizer 2200 (S10). In this regard, the gaze recognizer 2200 may recognize the user's face via the infrared camera.

After operation S10, the mouse control device 2000 using the gaze recognition may measure the distance between the user's eyes and the gaze recognizer 2200 (S20).

After operation S20, the mouse control device 2000 using the gaze recognition may set the minimum size of the mouse pointer based on the measured distance (S30).

After operation S30, the mouse control device 2000 using the gaze recognition may check the maximum size of the pointer based on the button layout in the screen displayed on the display 2100 (S40).

After operation S40, the mouse control device 2000 using the gaze recognition may check the size of the mouse pointer based on the display resolution (S50).

After operation S50, the mouse control device 2000 using the gaze recognition may determine whether the size of the mouse pointer based on the display resolution is smaller than the minimum size of the mouse pointer set based on the measured distance (S60).

After operation S60, in response to that the size of the mouse pointer based on the display resolution is smaller than the minimum size of the mouse pointer set based on the measured distance, the mouse control device 2000 using the gaze recognition may increase the size of the pointer within the screen such that the pointer is displayed in the physical minimum size (S70).

After operation S70, the mouse control device 2000 using the gaze recognition may correct the location and the movement of the eyes via the calibration (S80).

In one example, after operation S60, in response to that the size of the mouse pointer based on the display resolution is not smaller than the minimum size of the mouse pointer set based on the measured distance, the mouse control device 2000 using the gaze recognition may correct the location and the movement of the eyes via the calibration (S80).

After operation S80, the mouse control device 2000 using the gaze recognition may create the mouse size based on the shaking via the calibration (S90).

After operation S90, the mouse control device 2000 using the gaze recognition may determine whether the display resolution-pointer size is equal to or smaller than the maximum size of the pointer created via the calibration (S100).

After operation S100, the mouse control device 2000 may display the mouse pointer created via the calibration on the display 2100 in response to that the display resolution-pointer size is equal to or smaller than the maximum size of the mouse pointer created via the calibration (S120).

In one example, after operation S100, the mouse control device 2000 using the gaze recognition may limit the size of the mouse pointer up to the maximum size of the mouse pointer in response to that the display resolution-pointer size is not equal to or smaller than the maximum size of the mouse pointer (S110).

After operation S110, the mouse control device 2000 using the gaze recognition may display the mouse pointer whose size is limited up to the maximum size of the mouse pointer on the display 2100 (S120).

After operation S120, the mouse control device 2000 using the gaze recognition may sense that the user is gazing at a specific item on the display 2100 (S130).

After operation S130, the mouse control device 2000 using the gaze recognition may determine whether the mouse shaking occurs based on the sensed gazed point (S140).

After operation S140, the mouse control device 2000 using the gaze recognition may control the mouse pointer to be fixed in response to that no mouse shaking occurs (S170).

In one example, after operation S140, the mouse control device 2000 using the gaze recognition may determine whether the shaking range is greater than the mouse pointer area in response to that the mouse shaking occurs (S150).

After operation S150, the mouse control device 2000 using the gaze recognition may control the mouse pointer to move in response to that the shaking range is greater than the mouse pointer (S160).

Additionally, after operation S150, the mouse control device 2000 using the gaze recognition may control the mouse pointer to be fixed in response to that the shaking range is not greater than the mouse pointer (S170).

In other words, the technical idea of the present disclosure is applicable to an entirety of the autonomous vehicle or only to some components inside the autonomous vehicle. The scope of rights of the present disclosure must be determined based on the contents described in the patent claims.

In addition, as another aspect of the present disclosure, the operation of the proposal or the present disclosure described above may be provided as a code that may be implemented, carried out, or executed by a "computer" (a comprehensive concept including a system on chip (SoC) or a (micro) processor) or an application, a computer-readable storage medium, or a computer program product that stores or contains the code, and the scope of rights of the present disclosure is extensible to the code or the application, the computer-readable storage medium, or the computer program product that stores or contains the code.

As described above, various embodiment of the disclosure provide a method and device for controlling a mouse by using gaze recognition that, in order to prevent shaking of a local area of a mouse pointer using the gaze recognition: determine a shaking range based on a gazed point in a calibration stage; provide a size of the mouse pointer displayed based on the shaking range; provide an area of the pointer that is recognized via a gaze based on the shaking range; and fix an existing mouse location in response to a determination that the gaze is shaking and the shaking area overlaps the mouse pointer area.

Detailed descriptions of preferred embodiments of the present disclosure disclosed as described above are provided to enable those skilled in the art to implement and practice the present disclosure. Although the description has been made with reference to the preferred embodiments of the present disclosure, those skilled in the art will understand that the present disclosure described in the following claims may be modified and changed in various ways. For example, a person skilled in the art may use the respective components described in the above-described embodiments by combining the components with each other.

Accordingly, the present disclosure is not intended to be limited to the embodiments described herein, but is to be accorded the widest scope consistent with the principles and novel features disclosed herein.

What is claimed is:

1. A processor-implemented method for controlling a mouse using gaze recognition, the method comprising:

measuring a distance between eyes of a user and a gaze recognizer in response to a user gazing at an object displayed on a display;

setting a size of a mouse pointer based on at least one of the measured distance and a display resolution;

performing calibration based on the set size of the mouse pointer;

displaying the mouse pointer based on the calibration on a display;

determining occurrence of mouse shaking via gaze recognition by the gaze recognizer; and controlling a movement of the mouse pointer based on the mouse shaking, wherein the setting of the size of the mouse pointer comprises:

setting a minimum size of the mouse pointer based on the measured distance;

checking a maximum size of the pointer based on a button layout within a screen;

checking a display resolution-pointer size;

determining whether the display resolution-pointer size is smaller than the minimum size of the mouse pointer based on the measured distance; and increasing the size of the pointer within the screen such that the pointer is displayed in a physical minimum size in response to the display resolution-pointer size being smaller than the pointer minimum size.

2. The method of claim 1, wherein the performing of the calibration based on the set size of the mouse pointer comprises:

performing the calibration for eye location and movement based on the mouse shaking;

determining a shaking range based on a gazed point based on the user gaze; and creating the size of the mouse pointer based on the determined shaking range.

3. The method of claim 2, wherein the displaying of the mouse pointer created based on the calibration on the display comprises:

determining whether the display resolution-pointer size is equal to or smaller than a maximum size of the mouse pointer created by the calibration;

limiting the size of the mouse pointer up to the maximum size in response to the display resolution-pointer size not being equal to or smaller than the maximum size of the mouse pointer created by the calibration; and displaying the mouse pointer whose size is limited up to the maximum size on the display.

4. The method of claim 3, wherein the controlling of the movement of the mouse pointer based on the mouse shaking comprises:

determining whether the mouse shaking occurs;

determining whether the shaking range is greater than an area of the created mouse pointer in response to the mouse shaking;

controlling the mouse pointer to move in response to the shaking range being greater than the area of the mouse pointer; and controlling a location of the mouse pointer to be fixed in response to the shaking range being smaller than the area of the mouse pointer.

5. The method of claim 4, further comprising:

fixing an existing mouse pointer location when the shaking range is greater than an area of the mouse pointer.

6. A device for controlling a mouse using gaze recognition, the device comprising:

a display configured to display data, information, or contents on a screen;

a gaze recognizer configured to capture a facial image of a user gazing at the screen of the display to recognize a user's gaze;

a distance measurer configured to measure a distance between user's eyes and the gaze recognizer; and a mouse controller configured to, in response to a user gazing at an object displayed on the display:

control a mouse pointer based on the results recognized and measured by the gaze recognizer and the distance measurer;

set a size of the mouse pointer based on at least one of the measured distance and a display resolution;

perform calibration based on the set size of the mouse pointer;

display the mouse pointer based on the calibration on the display;

determine occurrence of mouse shaking via gaze recognition by the gaze recognizer; and control a movement of the mouse pointer based on the mouse shaking, wherein the mouse controller is further configured to:

set a minimum size of the mouse pointer based on the measured distance;

check a maximum size of the pointer based on a button layout within the screen;

check a display resolution-pointer size;

determine whether the display resolution-pointer size is smaller than the minimum size of the mouse pointer based on the measured distance; and increase the size of the pointer within the screen such that the pointer is displayed in a physical minimum size in response to the display resolution-pointer size being smaller than the pointer minimum size.

7. The device of claim 6, wherein the mouse controller is further configured to:

perform the calibration for eye location and movement based on the mouse shaking;

determine a shaking range based on a gazed point based on the user gaze; and create the size of the mouse pointer based on the determined shaking range.

8. The device of claim 7, wherein the mouse controller is further configured to:

determine whether the display resolution-pointer size is equal to or smaller than a maximum size of the mouse pointer created by the calibration;

limit the size of the mouse pointer up to the maximum size in response to the display resolution-pointer size not being equal to or smaller than the maximum size of the mouse pointer created by the calibration; and display the mouse pointer whose size is limited up to the maximum size on the display.

9. The device of claim 8, wherein the mouse controller is further configured to:

determine whether the mouse shaking occurs;

determine whether the shaking range is greater than an area of the created mouse pointer in response to the mouse shaking;

control the mouse pointer to move in response to the shaking range being greater than the area of the mouse pointer; and control a location of the mouse pointer to be fixed in response to the shaking range being smaller than the area of the mouse pointer.

10. The device of claim 9, wherein the mouse controller is further configured to fix an existing mouse pointer location when the shaking range is greater than the area of the mouse pointer.

\* \* \* \* \*